United States Patent [19]

Fette et al.

[11] 3,843,876

[45] Oct. 22, 1974

[54] ELECTRONIC DIGITAL ADDER HAVING A HIGH SPEED CARRY PROPAGATION LINE

[75] Inventors: Bruce A. Fette, Tempe; Lester H. Hazlett, Scottsdale, both of Ariz.

[73] Assignee: Motorola, Inc., Chicago, Ill.

[22] Filed: Sept. 20, 1973

[21] Appl. No.: 399,031

[52] U.S. Cl. .................................................. 235/175

[51] Int. Cl. .................................................. G06f 7/50

[58] Field of Search .............................. 235/175, 176

[56] References Cited

UNITED STATES PATENTS

| | | | |
|---|---|---|---|
| 3,465,133 | 9/1969 | Booher | 235/175 |
| 3,602,705 | 8/1971 | Cricchi | 235/175 |
| 3,717,755 | 2/1973 | Briley | 235/175 |

OTHER PUBLICATIONS

C. W. Weller, "A High-Speed Carry Ckt. for Binary Adders" IEEE Trans. on Computers Aug. '69 pp. 728–732.

R. M. Wade "Ripple Adder Carry Logic" IBM Tech. Disclosure Bulletin Apr. '68 pp. 1638–1639.

*Primary Examiner*—Malcolm A. Morrison
*Assistant Examiner*—David H. Malzahn
*Attorney, Agent, or Firm*—Vincent J. Rauner; Kenneth R. Stevens

[57] ABSTRACT

A parallel, binary adder has extremely high speed carry propagation capabilities. The sum and the carry generated in each stage are developed simultaneously and share much of the same circuitry. In a preferred embodiment utilizing metal oxide semiconductor field-effect transistors, a carry propagation line is charged prior to the addition and carry generation and then is simply discharged or not discharged, depending on the outcome of the computation. In four of the eight possible combinations of inputs to generate a carry-out signal, a carry-in gate is activated, providing a path with no other logic gates and permitting a high speed ripple of the carry signal.

8 Claims, 4 Drawing Figures

| | C | A | B | $\overline{A \cdot B}$ | A+B | $A \cdot B + \bar{A}\bar{B}$ | K | S |
|---|---|---|---|---|---|---|---|---|
| 1 | 0 | 0 | 0 | 1 | 0 | 1 | 0 | 0 |
| 2 | 0 | 0 | 1 | 1 | 1 | 0 | 0 | 1 |
| 3 | 0 | 1 | 0 | 1 | 1 | 0 | 0 | 1 |
| 4 | 0 | 1 | 1 | 0 | 1 | 1 | 1 | 0 |
| 5 | 1 | 0 | 0 | 1 | 0 | 1 | 0 | 1 |
| 6 | 1 | 0 | 1 | 1 | 1 | 0 | 1 | 0 |
| 7 | 1 | 1 | 0 | 1 | 1 | 0 | 1 | 0 |
| 8 | 1 | 1 | 1 | 0 | 1 | 1 | 1 | 1 |

ELECTRONIC DIGITAL ADDER HAVING A HIGH SPEED CARRY PROPAGATION LINE

BACKGROUND OF THE INVENTION

1. Field of the Invention

This invention relates in general to electronic binary adders and more particularly to binary full adders of the type used in digital computers for providing a facility to add two, multi-bit binary numbers, providing a sum which has been determined by contents of the two binary numbers and the carries generated.

2. Description of the Prior Art

Parallel, binary adders are well known, having been used as integral parts of digital computers. Typically, they operate by adding the lowest order two bits, generating a sum and carry, the carry then being added to the sum of the next higher pair of bits which generates still another carry which is then added to the sum of the next higher pair of bits, and so on. The total addition (or subtraction) is obviously dependent upon this type of carry propagation. When the binary numbers to be added are very large, the time taken to generate and propagate all carries is a substantial limiting factor to the speed of addition.

Another method of generating carries has been to "pyramid" the carries from a plurality of bits, thereby performing a so-called parallel carry generation. The pyramiding, depending upon the length of the numbers to be added, involves substantial hardware and substantial delay in the carry generation, and again becomes a limiting factor to the speed of addition.

A very fast prior art technique is the "look ahead" carry wherein the carry time is approximately two gate propagation delays. These systems have the drawback of requiring extreme logic complexity which is expensive in design and implementation.

Still another prior art method involves the use of MOS devices wherein the sum is generated through a number of the devices making up transmission switch logic and the carry is separately generated through a relatively large number of other transmission switch logic devices. The sum and carry are generated quickly but the circuitry is quite complex and requires relatively large voltage ranges to represent the binary states.

By sharing circuitry to generate the sum and carry, and by taking advantage of the fact that the carry-in is the same as the carry-out in six of the eight possible carry generations greatly reduces complexity and carry propagation time.

BRIEF SUMMARY OF THE INVENTION

The subject invention is directed to an arithmetic circuit including a carry generation circuit and a summing circuit which utilizes much of the carry generation circuit. A binary number representing the augend A having $n$ bits and a binary number representing the addend B having $n$ bits are entered in parallel in the binary adder of this invention and added together, each stage yielding a sum S and a carry-out K in response to input bits A and B and a carry-in bit C from the next lower order stage. In the case of the subtractive adder, the implementation is the same but the carries become borrows and the complement of B is subtracted from A, yielding a sum. Each stage receives signals corresponding to the appropriate bit of the addend and augend and also the carry-in from the next lowest order stage. Within each stage, a first logic array comprising a NAND circuit receives signals A and B and provides an output $\overline{A \cdot B}$. This NAND circuit, in conjunction with a second logic array, provides an EXCLUSIVE NOR circuit which yields the signal $A \cdot B + \bar{A} \cdot \bar{B}$.

An EXCLUSIVE NOR circuit is a third logic array having the input signal $A \cdot B + \bar{A} \cdot \bar{B}$ from the second array and also having the carry-in signal C as an input, the output then being the sum, $S = C\,(A \cdot B + \bar{A} \cdot \bar{B}) + \bar{C}\,(A \cdot \bar{B} + \bar{A} \cdot B)$. The output of the second logic array activates a carry-in gate when $A \neq B$. The output of the NAND circuit is applied to a carry-out generator which sets the carry-out $K = 1$ whenever $A = 1$ and $B = 1$. This embodiment is related to a single channel arrangement of insulated gate fieldeffect transistors, specifically metal oxide semiconductive devices.

The invention is also implemented in complementary MOS (CMOS) devices in the same fashion as described above, except for the wiring differences required within the known logic arrays. In the CMOS implementation, the EXCLUSIVE OR of input signals A and B is generated by inverting the EXCLUSIVE NOR signal. A transmission gate is inserted in the carry propagation line, serving as the carry-in gate which is activated by the application of each of the EXCLUSIVE NOR and EXCLUSIVE OR circuits. Of course, fieldeffect transistors without insulated gates may also be used. For convenience, all of the field-effect transistors referred to herein will be designated FET, whether insulated gate or not.

An object of this invention therefore, is to provide a parallel, binary adder having a very fast carry generation capability and relatively simple circuitry.

Still another object of this invention is to provide a straight-through carry propagation line whenever possible.

These and other objects are evident in the detailed description that follows.

DETAILED DESCRIPTION

Figures 1, 4:
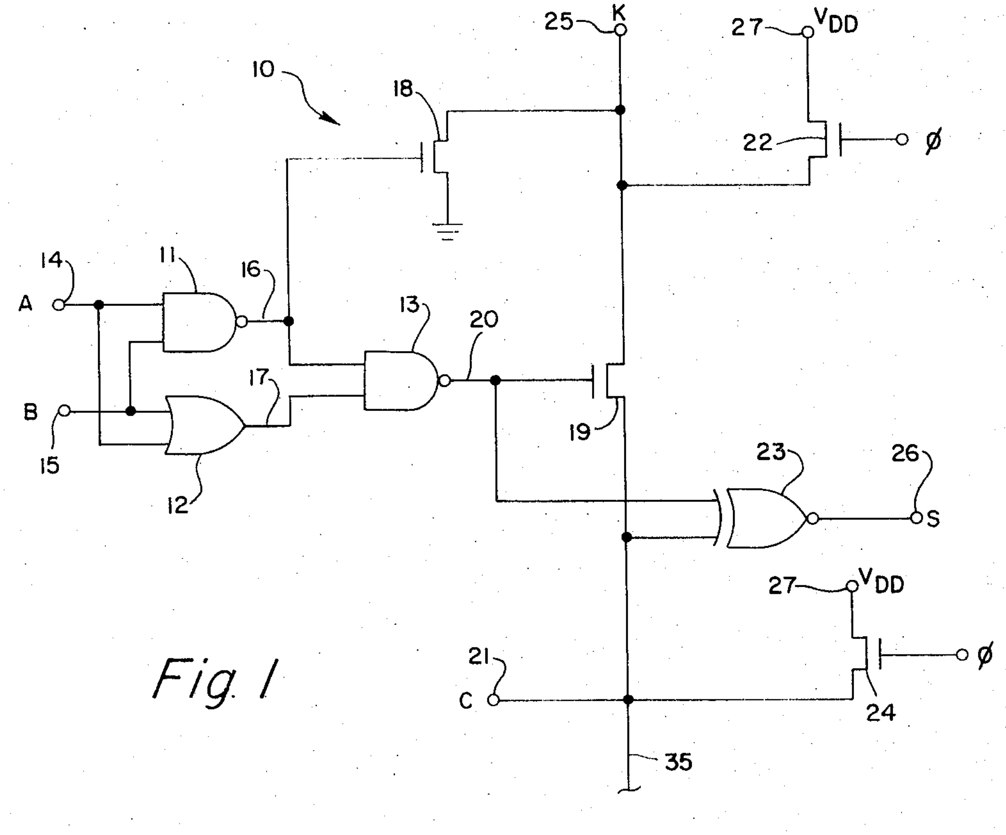
FIG. 1 is a logic diagram of one embodiment of this invention.
FIG. 4 is a table illustrating the binary values for the input signals, intermediate signals and output signals.

FIG. 1 illustrates addend signal A and augend signal B being received at terminals 14 and 15, respectively, of adder stage 10. NAND circuit 11 and OR circuit 12 each receive an input from terminals 14 and 15, the output line 16 of NAND circuit 11 being connected to the input of NAND circuit 13 and to the gate of insulated gate, field-effect transistor (FET) 18. The output of OR circuit 12 serves as the other input to NAND circuit 13 which has an output to the gate of FET 19 and serves as an input to EXCLUSIVE NOR circuit 23. The source of FET 18 is connected to ground and the drain is connected to carry propagation line 25 therefore. Input C is shown at terminal 21, which is connected to carry propagation line 35 as is terminal 25 at which the output carry signal K is provided. EXCLUSIVE NOR circuit 23 has its other input connected to carry propagation line 35 and its output is connected to terminal 26 at which the sum S is provided. FET 19 is in series with carry propagation line 35, its drain being connected to terminal 25 and its source being connected to terminal 21. Another FET 22 is shown with its source connected to the carry propagation line 35 and its drain connected to terminal 27 at which point $V_{DD}$ (−12V) is provided. The gate of FET 22 is connected to a clock (not shown) which provides a pulse $\phi$ at a predetermined time to turn on FET 22. FET 24 is connected in exactly the same way to terminal 27 for supplying $V_{DD}$ and to carry propagation line 35, with its gate connected to the source of clock pulse $\phi$.

In this preferred embodiment, the FETs are of the metal oxide semiconductor (MOS) P-channel type and positive logic is used as will be described in detail later. Also, the MOS devices are symmetrical in that the drain and source of each is reversible.

Figure 2:
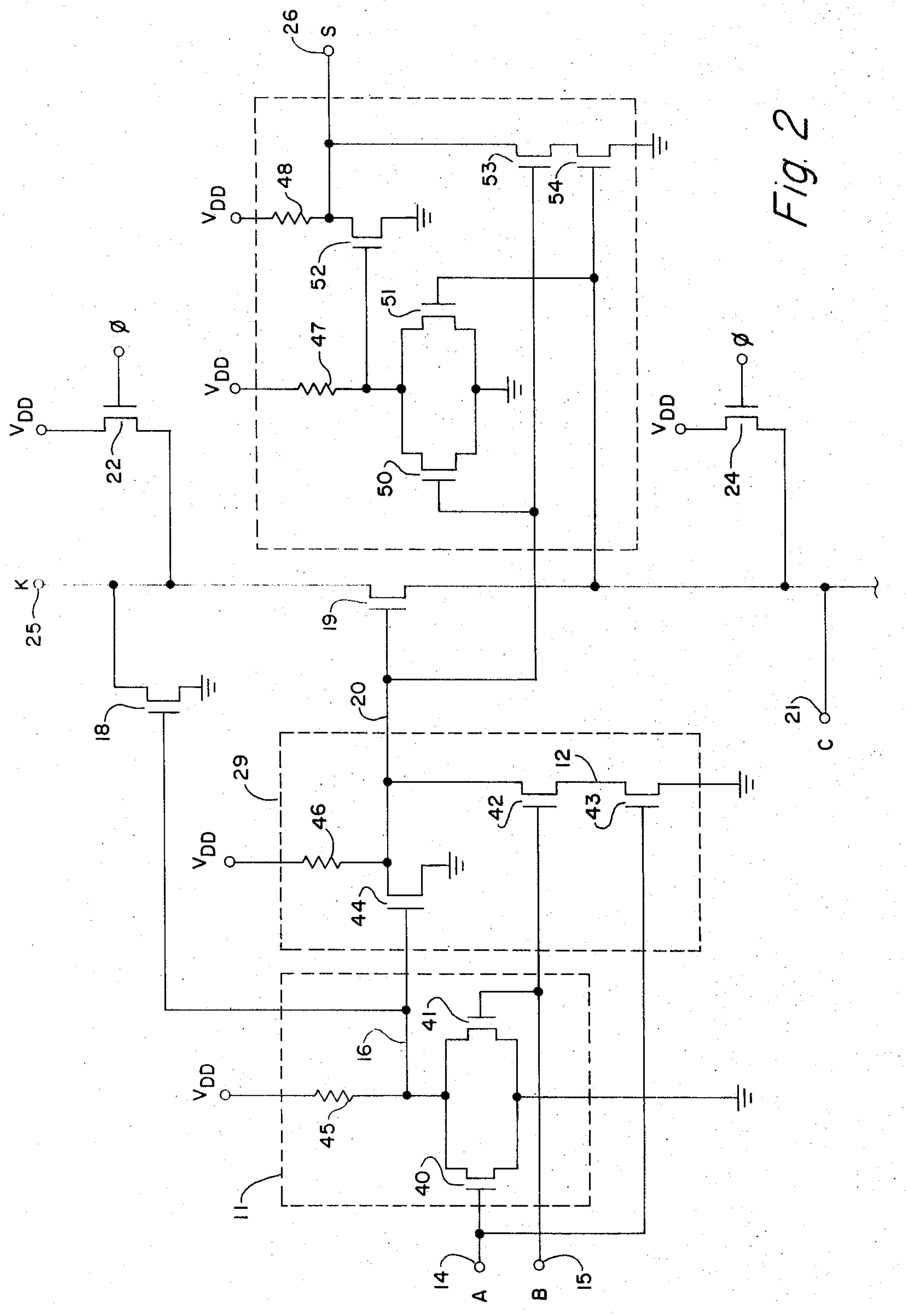
FIG. 2 is a schematic diagram of the embodiment of FIG. 1.

FIG. 2 is a schematic representation of the logic diagram of FIG. 1 with identical numbering of parts, where possible, for the sake of clarity. NAND circuit 11, which may be referred to as a first logic array, has FETs 40 and 41 with their sources connected together to ground and their drains connected together to voltage source $V_{DD}$ through resistance 45. Their drains are also connected to the gates of FETs 18 and 44. The gates of FETs 40 and 41 are connected to terminals 14 and 15, respectively.

OR circuit 12 and NAND circuit 13 make up a second logic network 29, which in detail, is made up of FETs 42, 43 and 44. FET 44 has its source grounded and its drain connected to $V_{DD}$ through resistance 46 and also has its drain connected to the drain of FET 42 whose source is, in turn, connected to the drain of FET 43. The gate of FET 42 is connected to terminal 15 and the gate of FET 43 is connected to terminal 14 with its source connected to ground. The drains of FETs 42 and 44 are connected via line 20 to the gate of FET 19, described in connection with FIG. 1, which serves as a carry-in gate. The connection of the drains of FETs 42 and 44 is also connected to the gates of FETs 50 and 53 which are part of the detail of a third logic array 23. Logic array 23 is schematically identical to the combination of logic arrays 11 and 29, with FETs 50 and 51 having their sources connected together to ground and their drains connected together to $V_{DD}$ through resistance 47 and also connected to the gate of FET 52. The gate of FET 51 is connected to the gate of FET 54 and to the carry propagation line 35. FET 52 has its source connected to ground and its drain connected to $V_{DD}$ through resistance 48 and also to the drain of FET 53 whose source is connected to the drain of FET 54 which has its source connected to ground. The connected drains of FETs 52 and 53 are further connected to terminal 26, providing the output sum, S.

Figure 3:
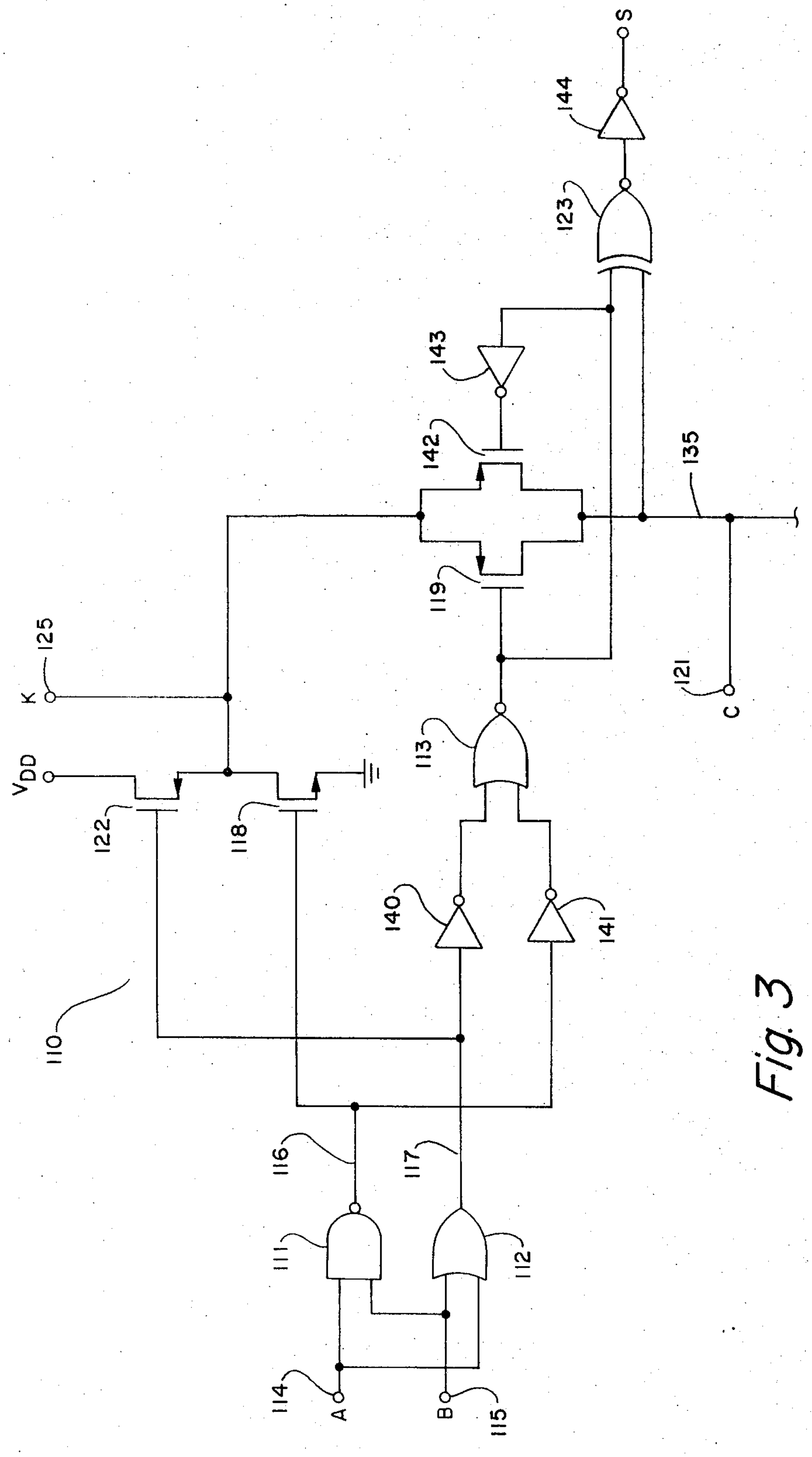
FIG. 3 is a logic diagram of a second embodiment of this invention.

FIG. 3 logically defines another embodiment of this invention wherein complementary metal oxide semiconductors (CMOS) are used. These devices will be also referred to as FETs. Terminals 114 and 115 serve as the inputs of adder 110 to receive addend signal A and augend signal B which serve as the inputs to NAND circuit 111 and OR circuit 112. NAND circuit 111 is a first logic array having an output on line 116 which is connected to the gate of FET 118 and to the input of inverter 141. OR circuit 112 serves as the input to inverter 140 and has its output also connected to the gate of FET 122. The drain of FET 122 is connected to $V_{DD}$ and its source is connected to both the drain of FET 118 and to the carry propagation line 135 which terminates at terminal 125 with the resultant carry K provided thereat. The outputs of inverters 140 and 141 each serve as inputs to NOR circuit 113, the combination of OR circuit 112, inverters 140 and 141, and NOR circuit 113 being a second logic array. The output of the second logic array on line 120 serves as an input to EXCLUSIVE NOR circuit 123, which serves as an input to inverter 144, the combination of elements 123 and 144 being a third logic array. The output of inverter 144 provides sum S. The other input to EXCLUSIVE NOR circuit 123 comes from the carry propagation line 135. The carry-in input C is provided at terminal 121. Complementary FETs 119 and 142 have their sources connected together to terminal 125 and their drains connected together to terminal 121. The gate of FET 119 is connected to the output of NOR circuit 113 and the gate of FET 142 is connected to the output of inverter 143 whose input comes from the output of NOR circuit 113.

MODE OF OPERATION

The description of the mode of operation uses a positive logic in connection with a negative voltage source. That is, $V_{DD} = -12$ volts, and binary $0 = -12$ volts and binary $1 = 0$ volts. Those with ordinary skill in the art realize that these selections are arbitrary and opposite designations can be used.

Referring first to FIG. 1, assume that addend A equals 0, augend B equal 0 and carry-in signal C equals 0. The output of NAND circuit 11 is expressed in Boolean algebra as $\overline{A \cdot B}$ which = 1 under these conditions. The output of OR circuit 12 is $A + B = 0$. The output of NAND circuit 13, in terms of input signals A and B, is $A \cdot B + \bar{A} \cdot \bar{B} = 1$. The output of NAND circuit 13 is applied via line 20 to the gate of device 19 but since it is a 1, FET 19, the carry-in gate, is not activated.

Prior to the introduction of signals A, B and C, pulse $\phi$ from a clock (not shown) is provided at the gate of devices 22 and 24 which charges the carry propagation lines 35 and 25 to −12 volts, a logical 0. With the output from NAND circuit 11 $\overline{A \cdot B} = 1$, FET 18 is not turned on and, as expected, the carry-out K remains a 0.

The input to EXCLUSIVE NOR circuit from line 35 is a 0 while the input from NAND circuit 20 is a 1. Output S at terminal 26, in terms of input signals A, B and C is:

$$S = C(A \cdot B + \bar{A} \cdot \bar{B}) + \bar{C}(A \cdot \bar{B} + \bar{A} \cdot B)$$

With $A = 0$, $B = 0$, and $C = 0$, $S = 0$. Line 1 in FIG. 4 shows the various binary values just discussed.

When $A = 1$ and $B = 1$, $K = 1$. The logic operation for this condition is illustrated in line 4 of FIG. 4 where it is indicated that $\overline{A \cdot B} = 0$, this value turning on FET 18 which places 0 volts, or a logical 1 at terminal 25 irrespective of the carry signal C at terminal 21. Line 8 of FIG. 4 shows the logic values to illustrate the situation where the carry-in C is also a 1. Again, a 0 is applied to the gate of FET 18 which places a 1 at terminal 25. Notice that in each of the cases at line 4 and line 8, the output of FET 18 is a 1 which does not enable the carry-in gate 19, making the output at terminal 25 completely independent of the input at terminal 21.

The difference between the logic input at line 4 and that at line 8 results in a difference in the sum S. When $A=1$, $B=1$ and $C=0$, the output of NAND circuit 13 is a 1 and the input C from terminal 21 is a 0 so that $S=0$. However, under the same circumstances, but with $C=1$, both inputs to EXCLUSIVE NOR circuit 23 = 1 and therefore $S=1$. This result may also be determined by solving the equation for S given above.

The equation for the carry-out signal K is:

$$K = A \cdot B + C\,(A + B)$$

The operation where $A=1$ and $B=1$ has been discussed above. The equation for K indicates that whenever either $A=1$ or $B=1$ and $C=1$, $K=1$. Line 6 of FIG. 4 illustrates the values when $A=0$, $B=1$ and $C=1$. Output $\overline{A \cdot B}=1$ which does not activate FET 18. The output of NAND circuit 13, however, is a 0 which activates carry-in gate device 19. Since carry-in signal $C=1$, the carry propagation line 35, initially charged to 0 is discharged through terminal 21 which is the carry-out signal K, from a preceding stage. The discharge of the carry propagation line 35 results in a 1 being applied at terminal 25 as the K carry-out.

Note that the carry-in gate 19 is activated four times as shown at lines 2, 3, 6 and 7 of FIG. 4 which illustrates that C equals K in each of these situations. Therefore the propagation of K is limited only by the on resistance of FET 19 and by circuit capacitance. All eight of the possible combinations of inputs shown in FIG. 4 may be explained in detail as indicated in the samples above. As described below, these values are also appropriate to the CMOS embodiment of FIG. 3.

NAND circuit 111 of FIG. 3 provides output $\overline{A \cdot B}$ which, as indicated at line 1, FIG. 4, is a 1 when $A=0$, $B=0$ and $C=0$. OR circuit 112 provides output $A+B=0$. Instead of precharging the carry propagation line 135 as in the P-channel configuration of FIG. 1, a pull-down FET 122 and a pull-up FET 118 is provided. With a 1 output at the gate of FET 118, it is not activated. FET 122, with a 0 on its gate is activated thereby placing $V_{DD}$ (−12V) at terminal 125 indicating $K=0$. The output of NOR circuit 113 provides the EXCLUSIVE OR function $A \cdot \overline{B} + \overline{A} \cdot B$ which is the negation of $A \cdot B + \overline{A} \cdot \overline{B}$, the EXCLUSIVE NOR function. The EXCLUSIVE NOR function is obtained by inversion through inverter 143 and is applied to the gate of FET 142 while the EXCLUSIVE OR function is applied to the gate of FET 119. With $A \cdot B=0$, the output of NOR circuit 113 = 1 and the output of inverter 143 = 0. In this embodiment, a transmission gate comprised of FETs 119 and 142 replaces the single device 19 of FIG. 1. A 1 on the gate of P-channel device 119 activates that device while a 0 on the gate of N-channel device 142 activates that device. As indicated, with $A \cdot B=0$ the transmission gate is not activated and therefore the carry-in signal C at terminal 121 has no effect on the output K at terminal 125. The sum is provided by applying the EXCLUSIVE OR function from NOR circuit 113 to the EXCLUSIVE NOR circuit 123 together with signal C. The output from EXCLUSIVE NOR circuit 123 is inverted by inverter 144 producing sum S as logically set out in the equation for S above. $S=0$ as indicated in line 1 of FIG. 4.

Line 8 of FIG. 4 illustrates $A=1$, $B=1$ and $C=1$. Under these circumstances, output $\overline{A \cdot B}$ from NAND circuit 111 equals 0, turning on device 118 which places a 1 at terminal 125 indicating $K=1$. The output from NOR circuit 113 is a 0 and the output as inverted through inverter 143 is a 1 thus causing the transmission gate to be turned on. The carry-in signal C at terminal 121 is a 1, and therefore output $K=1$ at terminal 125. All of the logic values shown in FIG. 4 can be proved by carefully tracing through the logic circuit of FIG. 3.

The embodiments illustrated herein involve the use of particular configurations of MOS and CMOS devices, but could also involve the use of silicon gate and junction field-effect transistors. While it is preferred that the circuit be implemented in monolithic, integrated form, an implementation of discrete devices is also within the scope of this invention. Also, the particular logic arrays to arrive at the various functions discussed is handy for the particular implementation used. However, it is well known that, for example, a NAND circuit can be simply an AND circuit followed by an inverter. There are also many ways to provide the EXCLUSIVE OR and the EXCLUSIVE NOR. Such logic configurations are known and are contemplated in the overall invention herein described.

We claim:

1. A digital adder including N-parallel full adder stages, each stage adaptive to receive its associated addend input signal A, its associated augend input signal B, and a carry-in signal C, for providing a carry-out signal K and a sum signal S, a plurality of the adder stages each comprising:

a. first MOS inverter mode logic means responsive to its associated addend input signal A and its associated augend input signal B for providing a first carry-out control signal at a first output means when its associated A and B input signals are both at a first predetermined level, and a second carry-out control signal at a second output means when its associated A and B input signals are at opposite levels;

b. a carry propagation line means serially interconnecting a plurality of the stages;

c. an MOS carry-in device gate means connected to said second output means and to said carry propagation line means for receiving a carry-in signal C from a lower order stage and being selectively responsive to said second carry-out control signal for generating a carry-out signal K for a higher order stage;

d. an MOS carry-out device gate means connected to said first output means and to said carry propagation line means for selectively providing a carry-out signal K for a higher order stage in response to the first carry-out control signal;

e. a second MOS inverter mode logic means connected to said second output means and to said carry propagation line means from a lower order stage for selectively generating an output signal S in response to its associated A and B input signals and a carry-in signal C from a lower order stage; and f. means for setting said propagation lines to a predetermined level.

2. A digital adder including N-parallel full adder stages, each stage adaptive to receive its associated addend input signal A, its associated augend input signal B, and a carry-in signal C, for providing a carry-out signal K and a sum signal S, as in claim 1 wherein:

a. said first MOS inverter mode logic means includes means for providing an AND logic function at said first output means, and means for providing an Exclusive-NOR function at said second output means.

3. A digital adder including N-parallel full adder stages, each stage adaptive to receive its associated addend input signal A, its associated augend input signal B, and a carry-in signal C, for providing a carry-out signal K and a sum signal S, as in claim 2 wherein:

a. said MOS carry-in and carry-out device gate means each comprise a single channel MOS device.

4. A digital adder including N-parallel full adder stages, each stage adaptive to receive its associated addend input signal A, its associated augend input signal B, and a carry-in signal C, for providing a carry-out signal K and a sum signal S, as in claim 3 wherein:

a. said means for setting said carry propagation lines to a predetermined level comprises a third MOS device gate means responsive to clock pulses for selectively and periodically setting said carry propagation line means to a predetermined level.

5. A digital adder including N-parallel full adder stages, each stage adaptive to receive its associated addend input signal A, its associated augend input signal B, and a carry-in signal C, for providing a carry-out signal K and a sum signal S, as in claim 3 wherein:

a. said second MOS inverter mode logic means comprises means for providing an Exclusive-NOR function.

6. A digital adder including N-parallel full adder stages, each stage adaptive to receive its associated addend input signal A, its associated augend input signal B, and a carry-in signal C, for providing a carry-out signal K and a sum signal S, as in claim 5 wherein:

a. said first and second MOS inverter mode logic means each comprise single channel MOS devices.

7. A digital adder including N-parallel full adder stages, each stage adaptive to receive its associated addend input signal A, its associated augend input signal B, and a carry-in signal C, for providing a carry-out signal K and a sum signal S, as in claim 2 wherein:

a. said MOS carry-in and carry-out device gate means each comprise CMOS devices.

8. A digital adder including N-parallel full adder stages, each stage adaptive to receive its associated addend input signal A, its associated augend input signal B, and a carry-in signal C, for providing a carry-out signal K and a sum signal S, as in claim 7 wherein:

a. said first and second inverter mode logic means each comprises CMOS devices.

* * * * *